(12) United States Patent
Jones et al.

(10) Patent No.: US 9,065,688 B2
(45) Date of Patent: Jun. 23, 2015

(54) GENERATING A SEARCH SET OF TELEVISION WHITE SPACE CHANNELS BASED ON LOCATION INFORMATION

(76) Inventors: Vincent K. Jones, Redwood City, CA (US); Hemanth Sampath, San Diego, CA (US); Stephen J. Shellhammer, Ramona, CA (US); Tevfik Yucek, Santa Clara, CA (US); Santosh Paul Abraham, San Diego, CA (US)

( * ) Notice: Subject to any disclaimer, the term of this patent is extended or adjusted under 35 U.S.C. 154(b) by 165 days.

(21) Appl. No.: 13/526,499

(22) Filed: Jun. 18, 2012

(65) Prior Publication Data

US 2013/0223357 A1    Aug. 29, 2013

Related U.S. Application Data

(60) Provisional application No. 61/603,821, filed on Feb. 27, 2012.

(51) Int. Cl.
| | |
|---|---|
| H04W 72/04 | (2009.01) |
| H04L 27/00 | (2006.01) |
| H04W 16/14 | (2009.01) |
| H04W 4/02 | (2009.01) |
| H04W 28/16 | (2009.01) |
| G01S 1/00 | (2006.01) |
| H04H 20/42 | (2008.01) |
| H04W 48/16 | (2009.01) |

(Continued)

(52) U.S. Cl.
CPC ........... *H04L 27/0006* (2013.01); *H04W 16/14* (2013.01); *H04W 4/02* (2013.01); *H04W 28/16* (2013.01); *H04W 48/16* (2013.01); *H04H 60/41* (2013.01); *H04H 60/51* (2013.01); *G01S 1/00* (2013.01); *H04H 20/42* (2013.01)

(58) Field of Classification Search
CPC ...... G01S 1/00; H04H 20/42; H04L 27/0006; H04W 16/14

See application file for complete search history.

(56) References Cited

U.S. PATENT DOCUMENTS

| | | | |
|---|---|---|---|
| 6,259,917 B1 * | 7/2001 | Elzein | 455/435.2 |
| 2007/0004404 A1 | 1/2007 | Buckley et al. | |
| 2007/0237121 A1 * | 10/2007 | Khandelwal et al. | 370/338 |

(Continued)

FOREIGN PATENT DOCUMENTS

| | | |
|---|---|---|
| WO | 2011099798 | 8/2011 |
| WO | 2012051151 A1 | 4/2012 |

OTHER PUBLICATIONS

Akyildiz, I.F., et al., "NeXt generation/dynamic spectrum access/cognitive radio wireless networks: A survey", Computer Networks, Elsevier Science Publishers B.V., Amsterdam, NL, vol. 50, No. 13, Sep. 15, 2006, pp. 2127-2159, XP028042158, ISSN: 1389-1286, DOI: 10.1016/J.COMNET.2006.05.001 [retrieved on Sep. 15, 2006] p. 2127-p. 2138.

(Continued)

*Primary Examiner* — Charles C Jiang
*Assistant Examiner* — Thad Defauw
(74) *Attorney, Agent, or Firm* — S. Hossain Beladi

(57) ABSTRACT

A method includes determining, at an electronic device, information associated with a location of the first electronic device. An initial set of television white space channels is filtered based on the information to generate a search set of television white space channels. A passive scan of the search set of television white space channels is performed at the electronic device to identify a television white space access point.

28 Claims, 8 Drawing Sheets

(51) Int. Cl.
  *H04H 60/41* (2008.01)
  *H04H 60/51* (2008.01)

(56) References Cited

U.S. PATENT DOCUMENTS

| | | |
|---|---|---|
| 2011/0268095 A1 | 11/2011 | Kim et al. |
| 2011/0310253 A1 | 12/2011 | Singh et al. |
| 2011/0310840 A1 | 12/2011 | Kennedy et al. |
| 2011/0310866 A1* | 12/2011 | Kennedy et al. ............ 370/338 |
| 2012/0008604 A1* | 1/2012 | Kasslin et al. ............... 370/338 |
| 2012/0134328 A1* | 5/2012 | Gauvreau et al. ........... 370/329 |
| 2012/0163179 A1* | 6/2012 | Jo et al. ...................... 370/237 |
| 2013/0195096 A1* | 8/2013 | Kim et al. .................... 370/338 |

OTHER PUBLICATIONS

Borth, D., et al., "Considerations for Successful Cognitive Radio Systems in US TV White Space", New Frontiers in Dynamic Spectrum Access Networks, 2008. Dyspan 2008. 3rd IEEE Symposium on, IEEE, Piscataway, NJ, USA, Oct. 14, 2008, pp. 1-5.

Chang, S.Y., et al., "TV White Space Related Regulations and Activities for WPAN; 15-11-0796-00-004m-tv-white-space-relatedregulations-and-activities-for-wpan",IEEE Draft; 15-11- 0796-00-004MTV-White-Space-Related-Regulations-And-Activities-FORWPAN, IEEE-SA Mentor, Piscataway, NJ USA, vol. 802.154m, Nov. 7, 2011, pp. 1-65.

Ghosh, C., et al., "Coexistence challenges for heterogeneous cognitive wireless networks in TV white spaces", IEEE Wireless Communications, IEEE Service Center, Piscataway, NJ, US, vol. 18, No. 4, Aug. 1, 2011, pp. 22-31.

International Search Report and Written Opinion—PCT/US2013/022212—ISA/EPO—Apr. 5, 2013.

Bahl, et al. "White Space Networking with Wi-Fi Like Connectivity", SIGCOMM '09 Aug. 17-21, 2009, 12 pp.

Kim, Eunsun, "Amendment Proposal for TV White Spaces Operation", IEEE 802.11-10/0263r2, Apr. 13, 2010, LG Electronics, Inc., 11 pp.

Kim, Eunsun, "Normative Text for Scanning in TV Whitespaces", IEEE 802.11-10/0472r1, Apr. 27, 2010, 10 pp.

* cited by examiner

GENERATING A SEARCH SET OF TELEVISION WHITE SPACE CHANNELS BASED ON LOCATION INFORMATION

CROSS-REFERENCE TO RELATED APPLICATIONS

The present application claims priority from commonly owned U.S. Provisional Patent Application No. 61/603,821 filed on Feb. 27, 2012, the contents of which are expressly incorporated herein by reference in their entirety.

BACKGROUND

1. Field

The present disclosure relates to television white space communication systems.

2. Background

Advances in technology have resulted in smaller and more powerful computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and Internet Protocol (IP) telephones, can communicate voice and data packets over wireless networks. Many such wireless telephones incorporate additional devices to provide enhanced functionality for end users. For example, a wireless telephone can also include a digital still camera, a digital video camera, a digital recorder, and an audio file player. Also, such wireless telephones can execute software applications, such as a web browser application that can be used to access the Internet. As such, these wireless telephones can include significant computing capabilities.

Electronic devices, such as wireless telephones, may have the ability to communicate via multiple types of wireless networks. One type of wireless network that has been the subject of recent regulatory action is television white space (TVWS). Now that broadcasters have converted analog TV channels to digital, the wireless spectrum formerly occupied by the analog TV channels has become vacant and is available for wireless communication. The Institute of Electrical and Electronics Engineers (IEEE) 802.11af is an amendment (in draft status) to the popular IEEE 802.11 wireless local area network (WLAN) standard, so that Wi-Fi can operate in these vacated frequency regions, which are commonly called television white space.

To communicate via television white space, a device must first scan for available networks (e.g., receive signals from access points operating in the television white space spectrum). Scanning processes may be classified as active or passive. In active scanning, a device transmits a probe message and may receive probe responses from access points. In passive scanning, the device listens for access points without transmitting any data. The Federal Communications Commission (FCC) requires certain TVWS-compatible devices to engage in passive scanning to avoid interference to broadcast TV signals. Typically, this passive scanning process involves listening for television white space access points in all possible/supported television white space channels. The frequency range and bandwidth of television white space channels may differ from one geographic region to another (e.g., North America vs. Europe vs. Japan). Moreover, even within the same geographic region, a particular television white space channel may be available in one area but not another due to the existence of a television station that broadcasts on the channel in one area but not the other. Thus, the process of scanning all possible television white space channels may be time consuming. For example, if access points transmit detectable messages every 100 ms, then scanning a few hundred possible television white space channels (i.e., frequency/bandwidth combinations) may take a few minutes.

In some television white space networks, an access point may provide a device with a white space map (WSM). The WSM may identify which television white space channels are available to the device and which television white space channels are not available to the device. However, until a WSM is received, the device may perform a brute-force search of all possible television white space channels, which may be time consuming and may expend battery resources at the device.

SUMMARY

Systems and methods of generating a search set of television white space channels based on location information are disclosed. When a device (or wireless communication component(s) therein) is powered up in a new location (e.g., after a user steps off an airplane), scanning all possible television white space channels may be time consuming. Instead of scanning all possible television white space channels, the described techniques may enable a smaller search set of channels to be scanned. The search set may be generated by filtering an initial set of all possible channels based on location information. Such location information may be generated at the device (e.g., by use of a global positioning system (GPS) receiver) or may be provided to the device via communication with an external device.

To illustrate, the device may receive a beacon message from a second device via a 2.4 GHz or 5 GHz network (e.g., an IEEE 802.11a/b/g/n/ac network), a sub-1 GHz network (e.g., an IEEE 802.11ah network), or another wireless network. The beacon message may include a country code or identify a regulatory domain, and the initial set of channels may be filtered based on the country code or regulatory domain prior to initiating the scan. As another example, when the device is located in a particular cell of a cellular network, the device may receive a list of nearby television white space access points from a base station of the cellular network. Alternatively, the device may request and receive (e.g., via the Internet) a list of nearby access points from a television white space database.

In a particular embodiment, a method includes determining, at a first electronic device, information associated with a location of the first electronic device. The method includes filtering an initial set of television white space channels based on the information to generate a search set of television white space channels. The method further includes performing, at the first electronic device, a passive scan of the search set of television white space channels to identify a television white space access point.

In another particular embodiment, an apparatus includes a processor and memory storing instructions executable by the processor to determine information associated with a location of a first electronic device. The instructions are also executable by the processor to filter an initial set of television white space channels based on the information to generate a search set of television white space channels. The instructions are further executable by the processor to initiate performing a passive scan of the search set of television white space channels to identify a television white space access point.

In another particular embodiment, a method includes determining, at an electronic device, information associated with a location of the electronic device. The method also includes sending a request from the electronic device to a television white space database, where the request includes the information. The method further includes receiving data identifying one or more television white space channels from the television white space database in response to the request. The method includes performing a passive scan of the one or more identified television white space channels to identify a television white space access point.

One particular advantage provided by at least one of the disclosed embodiments is an ability to reduce the number of TVWS channels to be scanned upon powering up a TVWS-compatible device. This reduction in the number of TVWS channels may result in faster establishment of TVWS communication and a more pleasant user experience.

Other aspects, advantages, and features of the present disclosure will become apparent after review of the entire application, including the following sections: Brief Description of the Drawings, Detailed Description, and the Claims.

DETAILED DESCRIPTION

Figure 1:
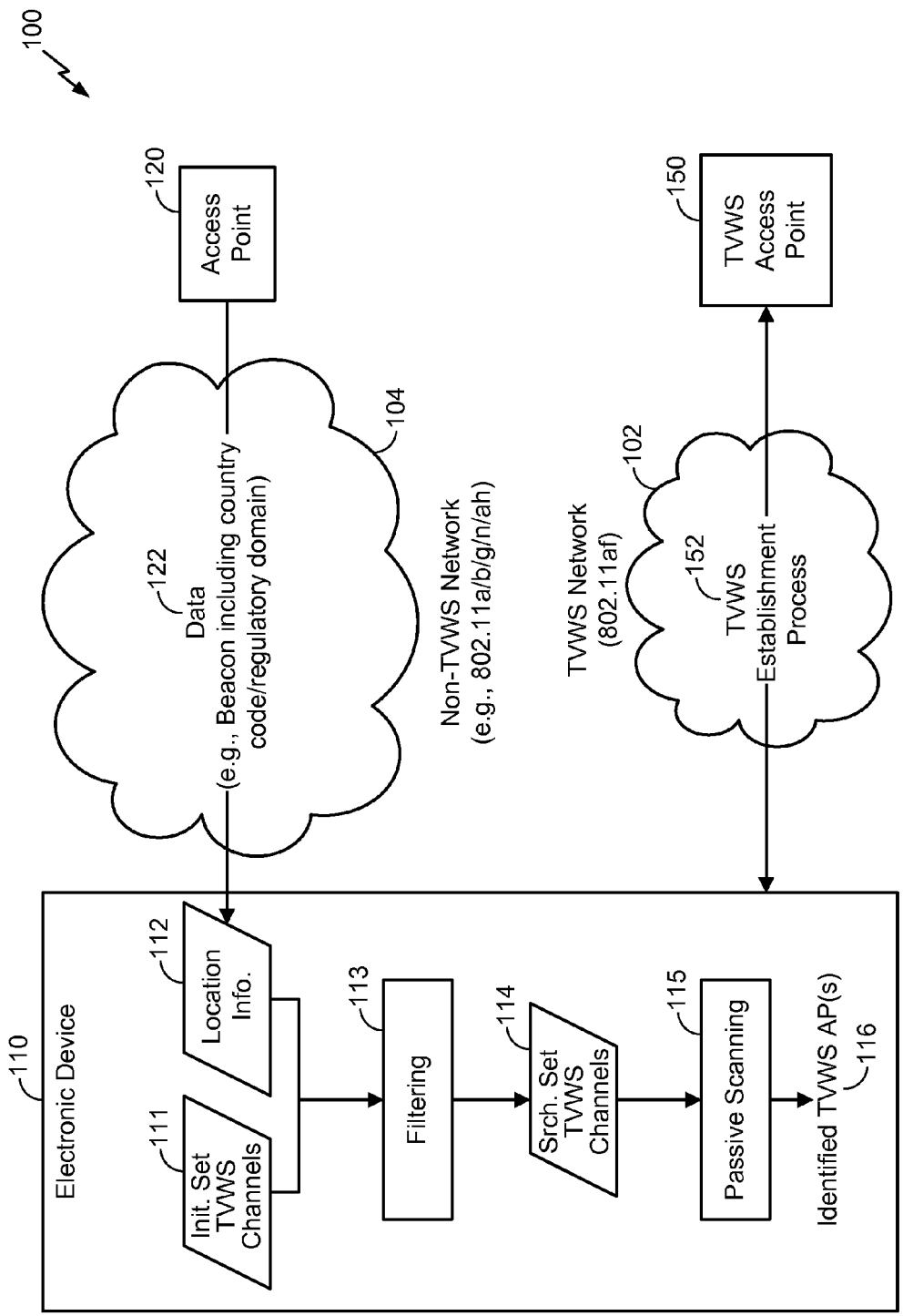
FIG. 1 is a diagram of a particular embodiment of a system that is operable to generate a search set of TVWS channels based on location information received via a non-TVWS network.

FIG. 1 is a diagram of a particular embodiment of a system 100 that is operable to generate a search set of television white space channels based on location information. The system 100 includes an electronic device 110 and a television white space access point (AP) 150. In a particular embodiment, the electronic device 110 may be a wireless telephone, a mobile computing device, a portable media player, or other electronic device capable of wireless communication. When enabled for television white space communication, the electronic device 110 may communicate with the television white space access point 150 and other devices via a television white space network 102.

The electronic device 110 may store an initial set 111 of television white space (TVWS) channels to be scanned in response to a power up event. For example, the power up event may represent the electronic device 110 being turned on, a wireless transmission and/or reception capability of the electronic device 110 being turned on (e.g., when the electronic device transitions out of "airplane mode"), or any combination thereof. In a particular embodiment, the initial set 111 may include all possible television white space channels worldwide and may be pre-programmed into the electronic device in accordance with a television white space standard (e.g., IEEE 802.11af). Upon powering up, the electronic device 110 may be unenabled for television white space communication. To become enabled for television white space communication, the electronic device 110 may search for and find a television white space access point (e.g., the television white space access point 150), as described herein.

The electronic device 110 may include a filtering module 113 and a passive scanning module 115. The filtering module 113 may filter the initial set 111 of television white space channels to generate a search set 114 of television white space channels that is smaller than the initial set 111. The passive scanning module 115 may perform a passive scan of the television white space channels included in the search set 114 to identify one or more television white space access points 116 (e.g., including the television white space access point 150). For example, if television access points are expected to transmit beacon messages every 100 milliseconds, the passive scanning module may sequentially listen for 100 milliseconds on each television white space channel in the search set 114 until a beacon message is heard and/or until all channels in the search set 114 have been listened to. In a particular embodiment, all or a portion of the modules 113 and 115 may be implemented by hardware at the electronic device, such as by dedicated circuitry, a controller, one or more other hardware devices, or any combination thereof. In a particular embodiment, all or a portion of the modules 113 and 115 may be implemented via processor executable instructions, as further described with reference to FIG. 8.

In a particular embodiment, the filtering module 113 may generate the search set 114 from the initial set 111 by filtering the initial set 111 based on information 112 that is representative of or associated with a location of the electronic device 110. To illustrate, if the location information 112 indicates that the electronic device 110 is in the United States, the filtering module 113 may filter out non-US television white space channels, where each channel is defined by a combination of carrier frequency and bandwidth. As another example, if the location information 112 indicates that the electronic device 110 is in a country subject to European Union television white space regulations (e.g., in the European regulatory domain), the filtering module 113 may filter out non-EU television white space channels.

In a particular embodiment, the location information 112 may be determined based on data 122 received via a non-TVWS network 104. For example, although the electronic device 110 is unenabled for television white space communication upon power up, the electronic device 110 may be enabled to send and receive data via the non-TVWS network 104. The non-TVWS network 104 may be a 2.4 GHz or 5 GHz network (e.g., compatible with an IEEE 802.11a protocol, an IEEE 802.11b protocol, an IEEE 802.11g protocol, an IEEE 802.11n protocol, an IEEE 802.11ac protocol, or any combination thereof). Alternately, or in addition, the non-TVWS network 104 may be a sub-1 GHz network (e.g., compatible with an IEEE 802.11ah protocol). Other non-TVWS networks, such as amplitude modulation (AM)/frequency modulation (FM) radio networks, satellite networks, etc. may also be used.

For example, the data 122 may include a beacon message received from an access point 120. The beacon message may include a country code indicating a country in which the access point 120 (and thus the electronic device 110) is located. Alternately, the beacon message may identify a regulatory domain that the access point 120 (and thus the electronic device 110) is subject to.

It should be noted that although the TVWS access point 150 and the non-TVWS access point 120 are depicted in FIG. 1 as being distinct, a single access point may support both TVWS networking as well as non-TVWS networking. Thus, in a particular embodiment, the access points 120 and 150 may be integrated into a single electronic device.

Figure 2:
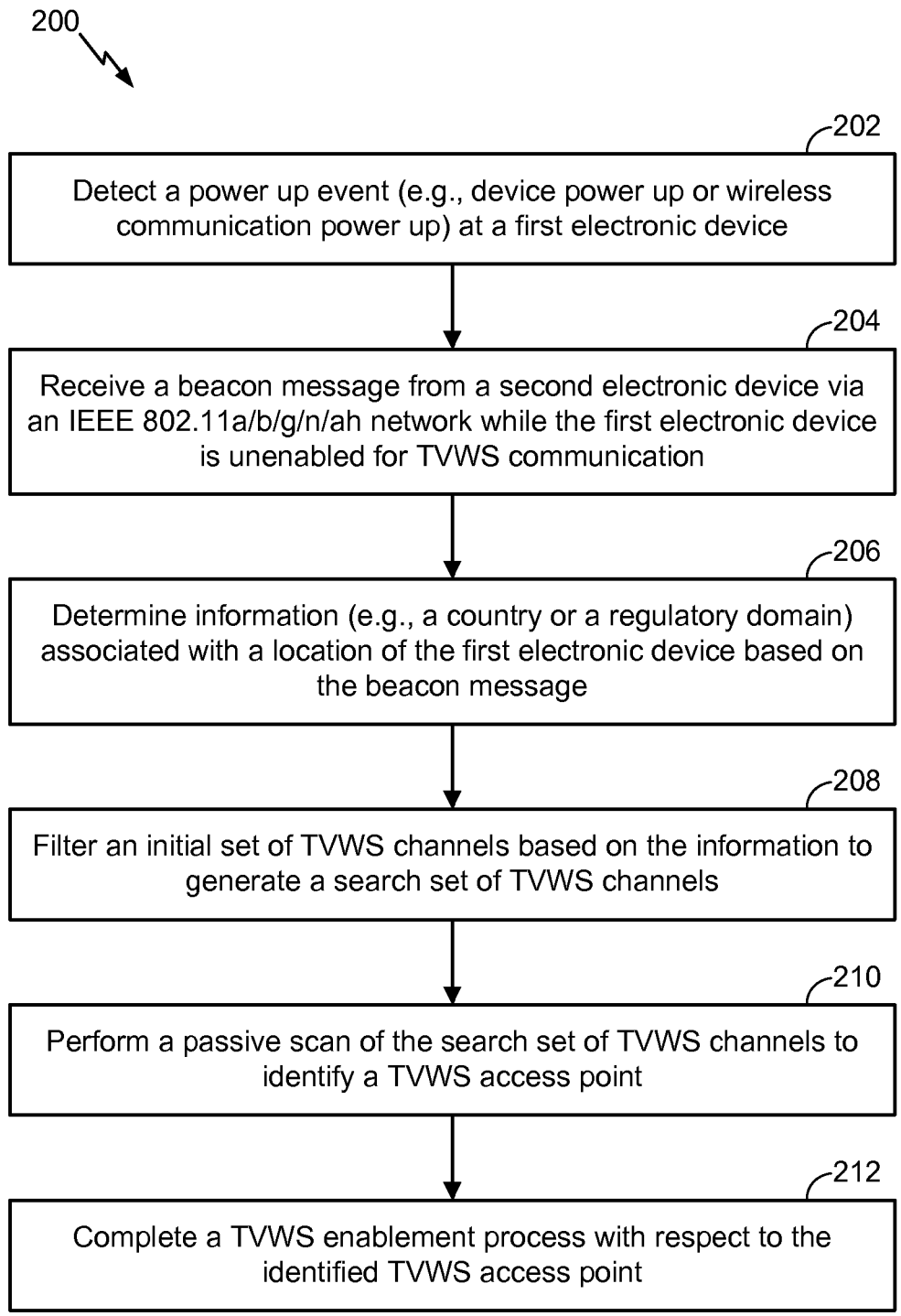
FIG. 2 is a flowchart of a particular embodiment of a method of operation at the system of FIG. 1.

A particular embodiment of a method of operation at the system 100 of FIG. 1 is illustrated in FIG. 2 and generally designated 200. The method 200 may include detecting a power up event at a first electronic device, at 202. For example, a device or wireless communication power up may be detected at the electronic device 110, such as after a user deplanes at an airport. The method 200 may also include receiving a beacon message from a second electronic device, at 204. The beacon message may be received via an IEEE 802.11a/b/g/n/ac/ah network while the first electronic device is unenabled for television white space communication. For example, the electronic device 110 may receive the data 122 from a second electronic device, such as the access point 120, where the data 122 includes a beacon message.

The method 200 may further include determining information associated with a location of the first electronic device based on the beacon message, at 206. For example, the electronic device 110 may determine the location information 112, where the location information includes a country or a regulatory domain. The method 200 may include filtering an initial set of television white space channels based on the information to generate a search set of television white space channels, at 208. For example, the filtering module 113 may filter the initial set 111 of television white space channels based on the location information 112 to generate the search set 114 of television white space channels.

The method 200 may also include performing a passive scan of the search set of television white space channels to identify a television white space access point, at 210. For example, the passive scanning module 115 may perform a passive scan on the television white space channels in the search set 114 to identify the one or more television white space access points 116. The method 200 may further include completing a television white space communication establishment process with respect to the identified television white space access point, at 212. For example, the electronic device 110 may complete a television white space communication establishment process 152 with respect to one of the identified television white space access points 116 (e.g., the television white space access point 150).

The system 100 of FIG. 1 and the method 200 of FIG. 2 may thus reduce, based on data received via a non-TVWS network, the number of TVWS channels to be scanned upon powering up a TVWS-compatible device. This reduction may result in faster establishment of TVWS communication and a more pleasant user experience.

Figure 3:
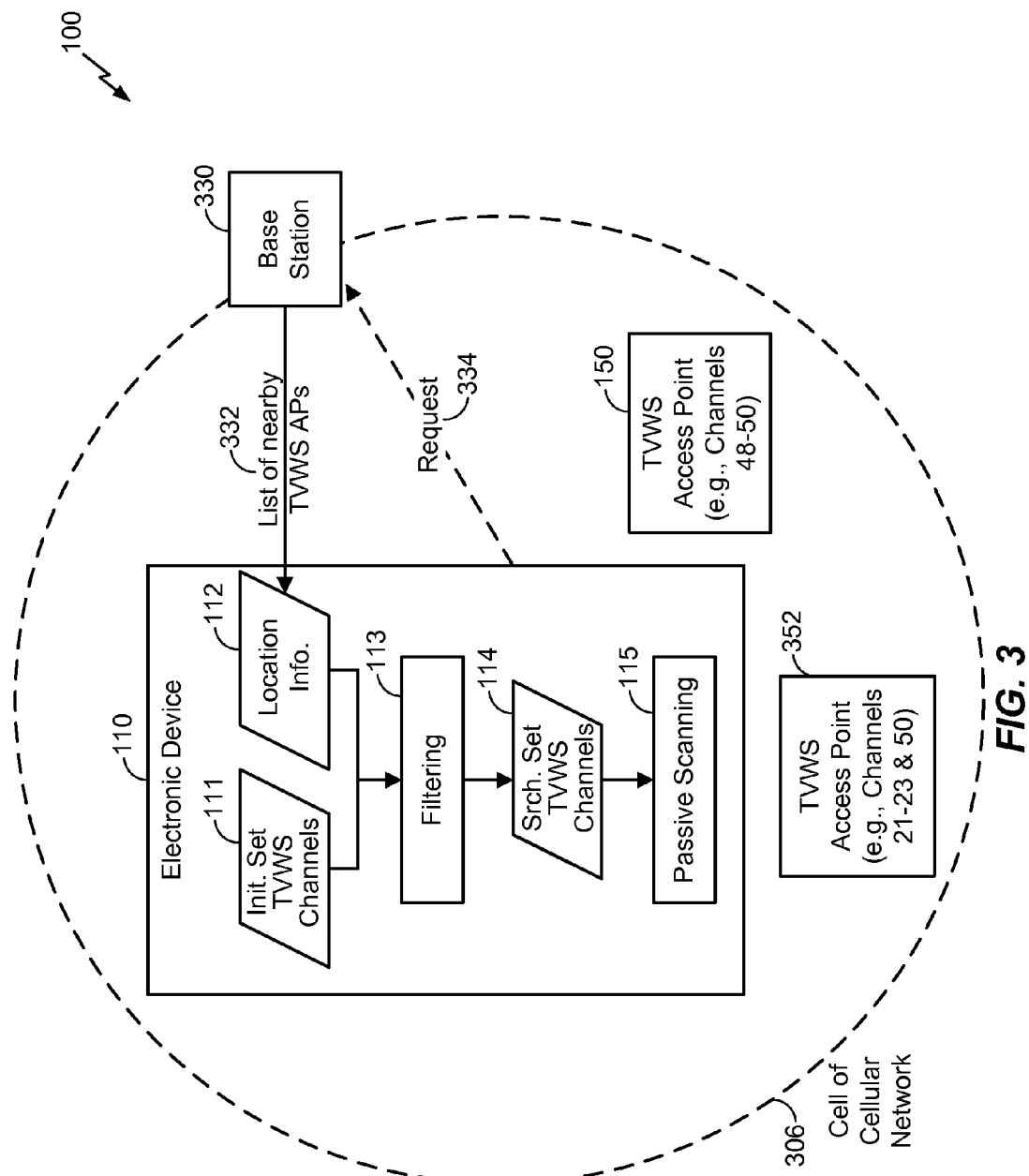
FIG. 3 is a diagram of a particular embodiment of a system that is operable to generate a search set of TVWS channels based on data received via a cellular network.

FIG. 3 is a diagram of a particular embodiment of a system 300 that is operable to generate a search set of television white space channels based on data received from a cellular network. For example, as illustrated in FIG. 3, the electronic device 110 may be located in a particular cell 306 of a cellular network and may be in communication with a second electronic device (e.g., a base station 330 of the cellular network). Examples of technologies that may be used by the cellular network may include, but are not limited to, long term evolution (LTE), global system for mobile communications (GSM), general packet radio service (GPRS), enhanced data rates for GSM evolution (EDGE), universal mobile telecommunications system (UMTS), UMTS terrestrial radio access network (UTRAN), generic radio access network (GRAN), evolution-data optimized (1x/DO), wideband code division multiple access (WCDMA), Worldwide Interoperability for Microwave Access (WiMAX), or any combination thereof.

In a particular embodiment, the electronic device 110 may determine the location information 112 based on data received from the base station 330. For example, the base station 330 may determine that the electronic device 110 is in the cell 306 based on characteristics of signals received from the electronic device 110. The base station 330 may provide the electronic device 110 with a list 332 of nearby television white space access points. For example, the list 332 may include the television white space access point 150 and another television white space access point 352, both of which are located in the same cell 306 as the electronic device 110. In a particular embodiment, the list 332 may be provided to the electronic device 110 in response to a request 334 for the list 332. Alternately, the list 332 may be "pushed" to the electronic device 110 (e.g., as part of pilot or control procedures at the cellular network).

Each television white space access point in the list 332 may support communication on one or more television white space channels. Further, multiple television white space access points may support communication on the same television white space channel. For example, the television white space access point 150 may operate on channels 48, 49, and 50, and the television white space access point 352 may operate on the channels 21, 22, 23, and 50. Thus, in the example of FIG. 1, the filtered search set 114 may include and/or prioritize television white space channels 21, 22, 23, 48, 49, and 50. By identifying individual access points instead of merely identifying available channels as in a white space map (WSM), the list 332 may lead to faster establishment of television white space communication when multiple access points support communication on the same television white space channel.

Figure 4:
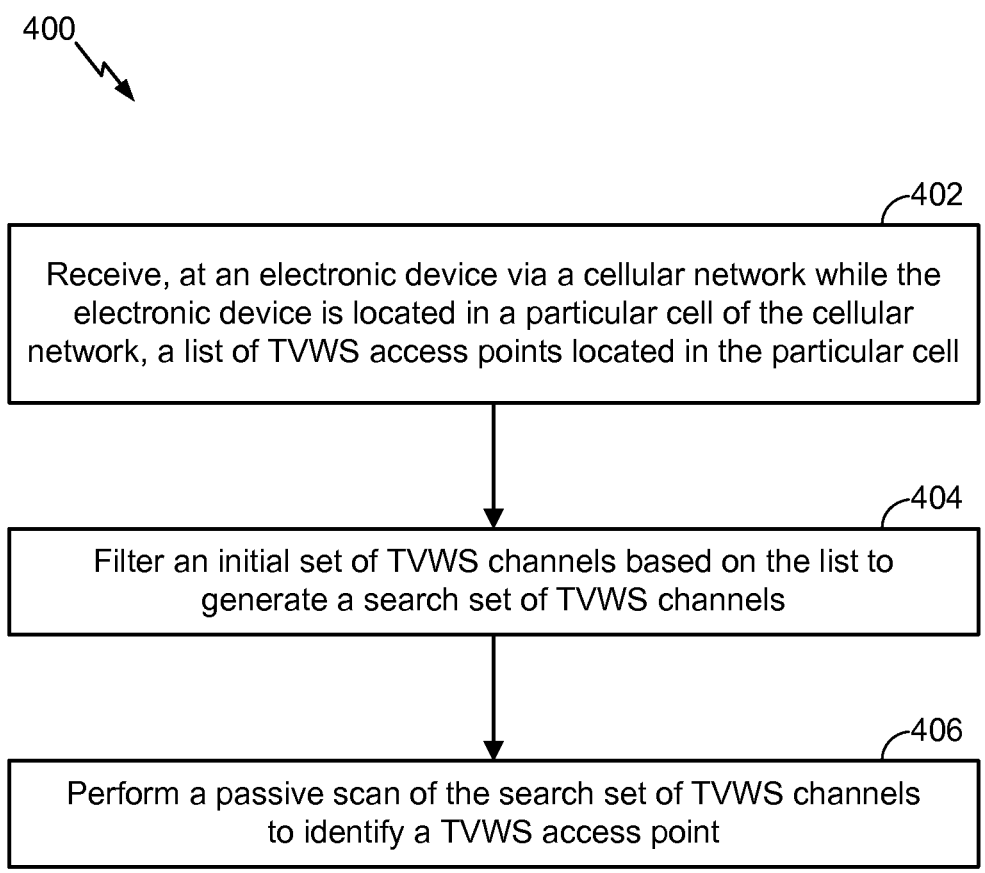
FIG. 4 is a flowchart of a particular embodiment of a method of operation at the system of FIG. 3.

A particular embodiment of a method of operation at the system 300 of FIG. 3 is illustrated in FIG. 4 and generally designated 400. The method 400 includes receiving, at an electronic device via a cellular network while the electronic device is located in a particular cell of the cellular network, a list of television white space access points located in the particular cell, at 402. For example, the electronic device 110 may receive the list 332 while located in the cell 306. The method 400 may also include filtering an initial set of television white space channels based on the list to generate a search set of television white space channels, at 404. For example, the filtering module 113 may filter the initial set 111 based on the list 332 to generate the search set 114. The method 400 may further include performing a passive scan of the search set of television white space channels to identify a television white space access point, at 406. For example, the passive scanning module 115 may perform a passive scan on the television white space channels in the search set 114 to identify the television white space access point 150 and/or the television white space access point 352.

The system 300 of FIG. 3 and the method 400 of FIG. 4 may thus reduce, based on data received from a cellular network, the number of TVWS channels to be scanned upon powering up a TVWS-compatible device. This reduction may result in faster establishment of TVWS communication and a more pleasant user experience.

Figure 5:
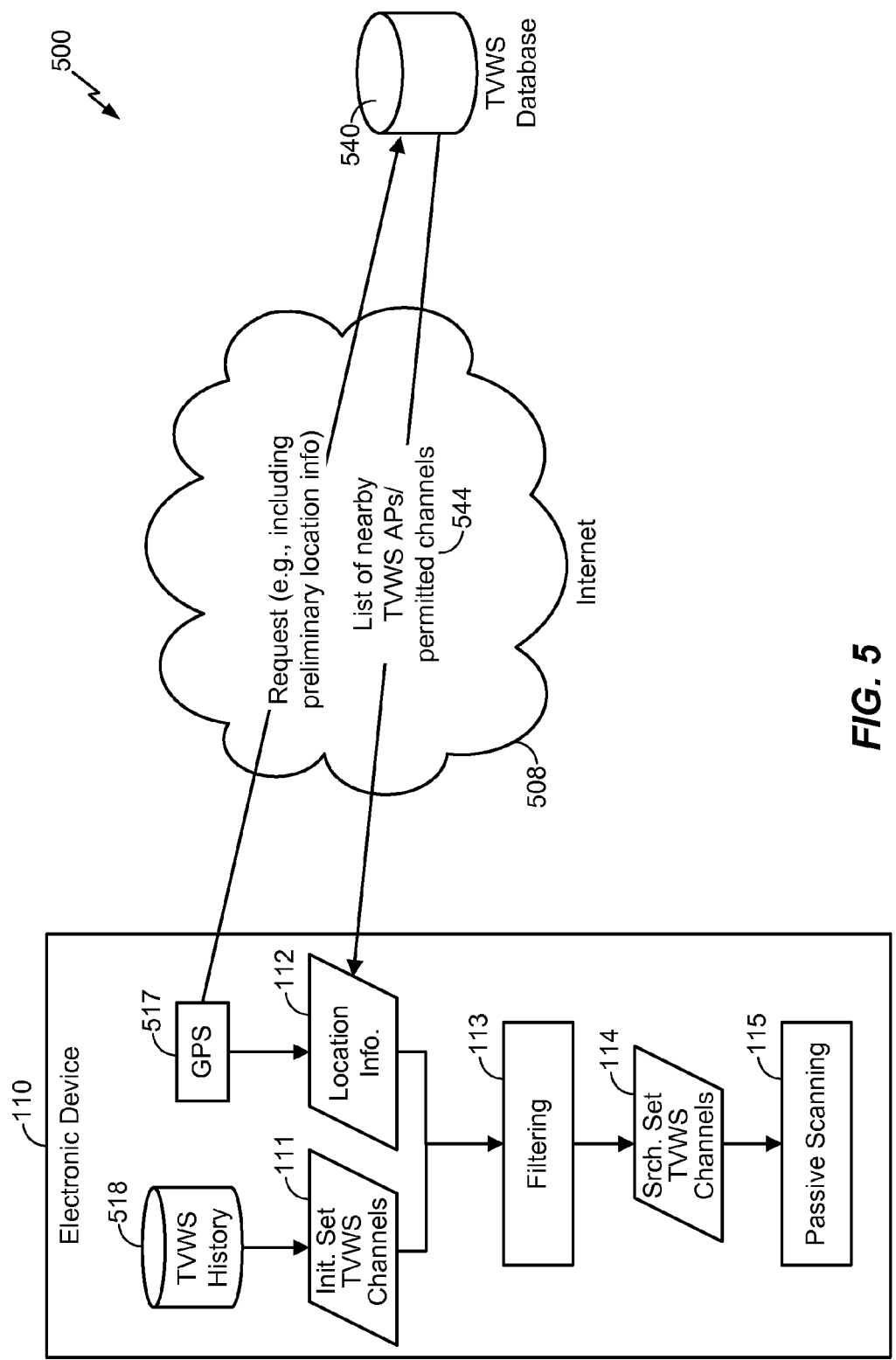
FIG. 5 is a diagram of another particular embodiment of a system that is operable to generate a search set of TVWS channels.

FIG. 5 is a diagram of another particular embodiment of a system 500 that is operable to generate a search set of television white space channels.

In a particular embodiment, the electronic device 110 may include a global positioning system (GPS) receiver 517. In such an embodiment, the location information 112 may be determined without assistance from external devices, such as when the electronic device 110 is disconnected from IEEE 802.11 and cellular networks. To illustrate, the GPS receiver 517 may provide coordinates based on which the location information 112 is determined, where the location information 112 may include a city, state, or country in which the electronic device 110 is located. Based on the location information 112, the filtering module 113 may filter out television white space channels known to be unsupported, unpermitted, or unavailable in the city, state or country (e.g., due to the existence of television stations and/or previously registered television white space users on those channels). For example, if output from the GPS receiver 517 indicates that the electronic device 110 is located in Japan, television white space frequencies that are not supported in Japan may be filtered out by the filtering module 113.

In a particular embodiment, the electronic device 110 may maintain a history 518 of previously found television white space channels and locations associated therewith. A list of previously found television white space channels may be included in the initial set 111. For example, an owner of the electronic device 110 may have previously found and used channel "X" in the US and channel "Y" in Europe.

The filtering module 113 may filter out channels from the initial set 111 that do not match the location information 112 provided by the GPS receiver 517. For example, if output from the GPS receiver 517 indicates that the electronic device 110 is located in the United States, the channel "X" may be prioritized in the search set 114 whereas the channel "Y" may be absent from or de-prioritized in the search set 114.

In a particular embodiment, the location information 112 may be received from a second electronic device (e.g., a television white space database 540). The television white space database 540 may be regional (e.g., include information on television white space access points and permitted television white space channels in a particular region) or global (e.g., include information on television white space access points and permitted in different regions around the world). The television white space database 540 may support client connections with devices that are unenabled for television white space communication, such as the device 110. To illustrate, the electronic device 110 may send a request 542 to the television white space database 540. The request may include preliminary location information determined by the GPS receiver 517. Alternately, the preliminary location information may be received at the electronic device from a cellular network, as described with reference to FIG. 3.

In response to the request 542, the television white space database 540 may provide the electronic device 110 a list 544 of nearby television white space access points, a list of permitted television white space channels, or any combination thereof. In a particular embodiment, the request 542 and the list 544 may be communicated via the Internet 508. The filtering module 113 may generate the search set 114 based on the list 544.

In a particular embodiment, the GPS receiver 517 and the television white space database 540 may enable reducing a number of television white space channels to scan without use of the filtering module 113. For example, the GPS receiver 517 may determine preliminary location information that is provided to the television white space database 540 in the request 542. The television white space data 540 may use the preliminary location information to generate the list 544 identifying access points and/or television white space channels, and may send the list 544 to the electronic device 110. The electronic device 110 may treat the list 544 as the search set 114, and the passive scanning module 115 may perform passive scanning on the search set 114.

In a particular embodiment, the electronic device 110 may maintain the TVWS history 518 as well as a non-TVWS history (e.g., a Wi-Fi history). Each maintained history may track network identifiers, such as service set identifiers (SSIDs). For example, the electronic device 100 may maintain a set of previously found TVWS channels, associated locations, and associated TVWS access point SSIDs in the history 518 and may maintain a set of previously found non-TVWS access point SSIDs (e.g., Wi-Fi SSIDs) and locations in a non-TVWS history (e.g., a Wi-Fi history). When the electronic device 110 detects a familiar Wi-Fi SSID, the electronic device 110 may deduce its location from the Wi-Fi history and may scan for TVWS access points from the TVWS history 518 that have the same or nearby location.

Figure 6:
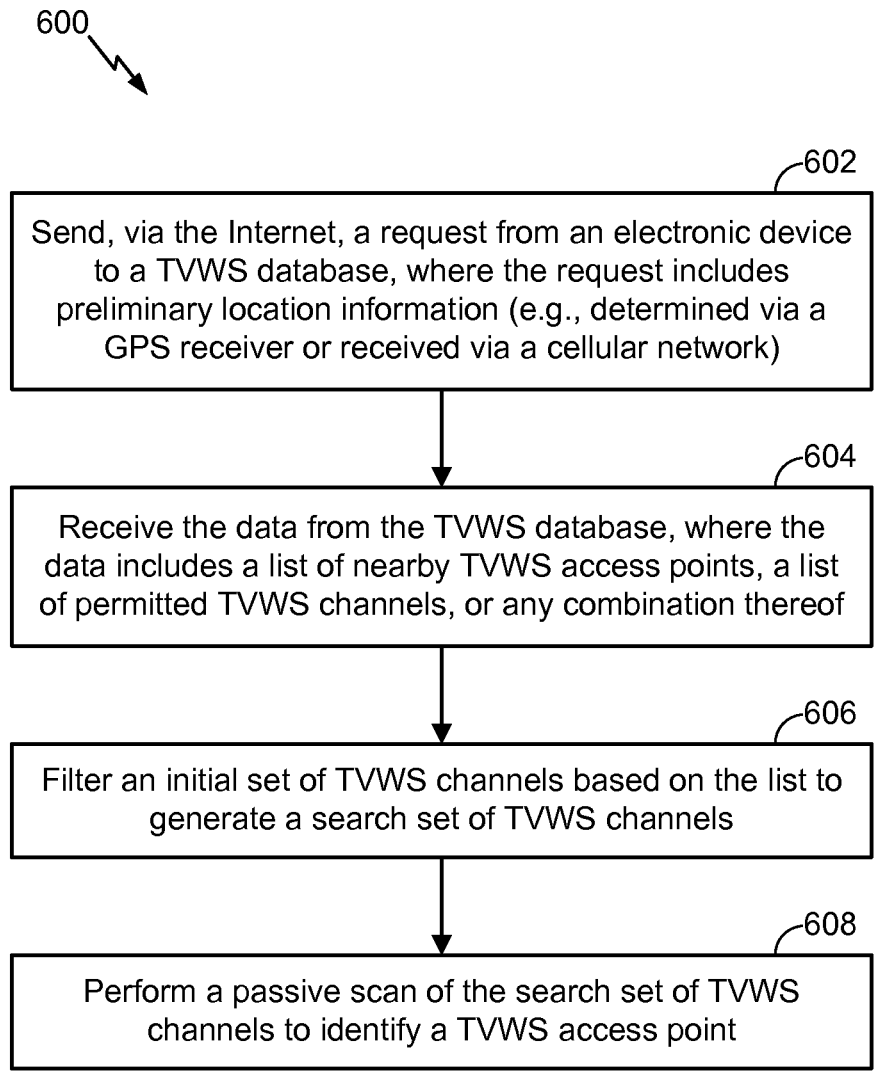
FIG. 6 is a flowchart of a particular embodiment of a method of operation at the system of FIG. 5.

A particular embodiment of a method of operation at the system 500 of FIG. 5 is illustrated in FIG. 6 and generally designated 600. The method 600 may include sending, via the Internet, a request from an electronic device to a television white space database, at 602. The request may include preliminary location information determined via a GPS receiver or received via a cellular network. For example, the electronic device 110 may send the request 542 to the television white space database 540.

The method 600 may also include receiving the data from the television white space database, at 604. The data may include a list of nearby television white space access points, a list of permitted television white space channels, or any combination thereof. For example, the electronic device 110 may receive the list 544 from the television white space database 540. The method 600 may further include filtering an initial set of television white space channels based on the list to generate a search set of television white space channels, at 606. For example, the filtering module 113 may filter the initial set 111 based on the list 544 to generate the search set 114. The method 600 may include performing a passive scan of the search set of television white space channels to identify a television white space access point, at 608. For example, the passive scanning module 115 may perform a passive scan of channels in the search set 114 to identify a television white space access point.

Figure 7:
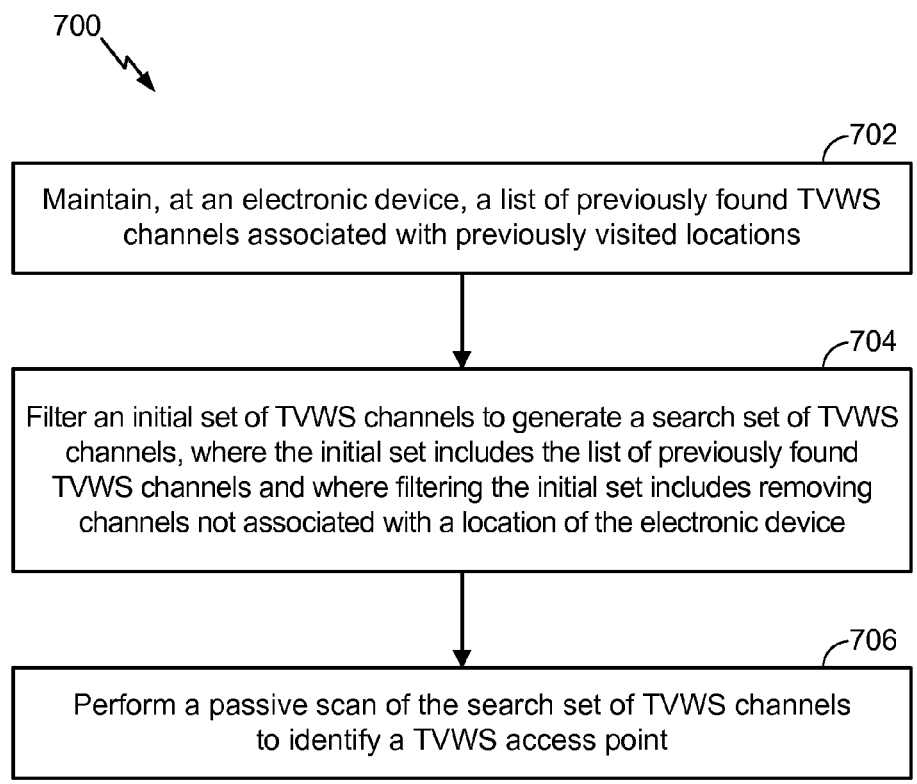
FIG. 7 is a flowchart of another particular embodiment of a method of operation at the system of FIG. 5.

Another particular embodiment of a method of operation at the system 500 of FIG. 5 is illustrated in FIG. 7 and generally designated 700. The method 700 may include maintaining, at an electronic device, a list of previously found television white space channels associated with previously visited locations, at 702. For example, the electronic device 110 may maintain a list of previously found television white space channels in previously visited locations (e.g., as the television white space history 518). The method 700 may also including filtering an initial set of television white space channels to generate a search set of television white space channels, where the initial set may include the list of previously found television white space channels, at 704. Filtering the initial set may include removing channels not associated with a location of the electronic device. For example, the initial set 111 may include the list of previously found television white space channels from the history 518, the GPS receiver 517 may determine a current location of the electronic device 110, and the filtering module 113 may filter out previously found TVWS channels that are not associated with the current location.

The method 700 may include performing a passive scan of the search set of television white space channels to identify a television white space access point. For example, the passive scanning module 115 may perform a passive scan of channels in the search set 114 to identify a television white space access point.

The system 500 of FIG. 5 and the methods 600 and 700 of FIGS. 6 and 7 may thus reduce, based on GPS information and/or filtering of a TVWS history, the number of TVWS channels to be scanned upon powering up a TVWS-compatible device. This reduction may result in faster establishment of TVWS communication and a more pleasant user experience.

Figure 8:
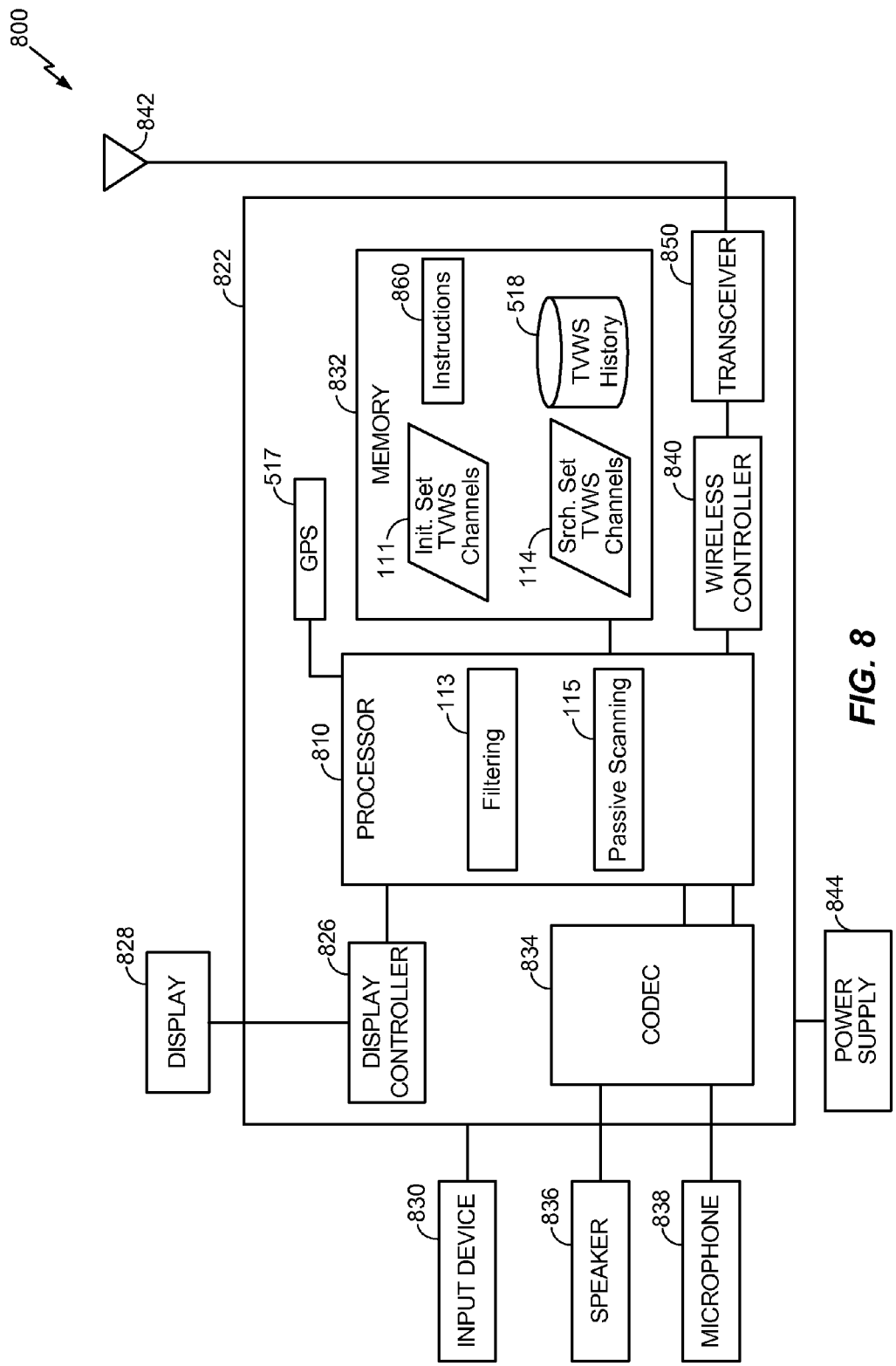
FIG. 8 is a block diagram of a wireless device including components that are operable to generate a search set of TVWS channels based on location information.

FIG. 8 is a block diagram of a mobile communication device 800. In one embodiment, the mobile communication device 800, or components thereof, include or are included within the electronic device 110 of FIGS. 1, 3, and 5. Further, all or part of the methods described in FIGS. 2, 4, 6, and 7 may be performed at or by the mobile communication device 800. The mobile communication device 800 includes a processor 810, such as a digital signal processor (DSP), coupled to a memory 832.

The memory 832 may be a non-transitory tangible computer-readable and/or processor-readable storage medium that stores instructions 860. The instructions 860 may be executable by the processor 810 to perform one or more functions or methods described herein, such as the methods described with reference to FIGS. 2, 4, 6, and 7. For example, the instructions 860 may be executable by the processor 810 to implement the filtering module 113 and the passive scanning module 115. The memory 832 may also store the initial set 111 of television white space channels, the search set 114 of television white space channels, and sets of previously found TVWS and non-TVWS channels/network identifiers/locations (e.g., the television white space history 518, a non-TVWS history, etc.). In a particular embodiment, the mobile communication device 800 may include the GPS receiver 517.

FIG. 8 also shows a display controller 826 that is coupled to the processor 810 and to a display 828. A coder/decoder (CODEC) 834 can also be coupled to the processor 810. A speaker 836 and a microphone 838 can be coupled to the CODEC 834. FIG. 8 also indicates that wireless a controller 840 can be coupled to the processor 810, where the wireless controller 840 is in communication with a wireless antenna 842 via a transceiver 850. The wireless controller 840, the transceiver 850, and the wireless antenna 842 may thus represent a wireless interface that enables wireless communication by the mobile communication device 800. The mobile communication device 800 may include numerous such wireless interfaces, where different wireless networks are configured to support different networking technologies or combinations of networking technologies.

In a particular embodiment, the processor 810, the display controller 826, the memory 832, the CODEC 834, the wireless controller 840, the transceiver 850, and the GPS receiver 517 are included in a system-in-package or system-on-chip device 822. In a particular embodiment, an input device 830 and a power supply 844 are coupled to the system-on-chip device 822. Moreover, in a particular embodiment, as illustrated in FIG. 8, the display device 828, the input device 830, the speaker 836, the microphone 838, the wireless antenna 842, and the power supply 844 are external to the system-on-chip device 822. However, each of the display device 828, the input device 830, the speaker 836, the microphone 838, the wireless antenna 842, and the power supply 844 can be coupled to a component of the system-on-chip device 822, such as an interface or a controller.

It should be noted that although the illustrated embodiments are described with reference to portable devices (e.g., cellular telephones), a search set of television white space channels may be generated as described herein by other types of devices. For example, any IEEE 802.11af-compatible device operating in "Mode 1" mode may generate a search set of television white space channels. Such devices may include fixed and portable devices/stations that can switch between multiple modes (e.g., "Mode 1" and "Mode 2").

In conjunction with the described embodiments, an apparatus may include means for determining information associated with a location of an electronic device. For example, the means for determining may include the electronic device 110 of FIGS. 1, 3, and 5, and 8 or a component thereof (e.g., a GPS receiver or a processor that receives information from a cellular network), one or more other devices configured to determine information associated with a location of an electronic device, or any combination thereof. The apparatus may also include means for filtering an initial set of television white space channels based on the information to generate a search set of television white space channels. For example, the means for filtering may include the filtering module 113 of FIGS. 1, 3, 5, and 8, one or more other services configured to filter a set of television white space channels, or any combination thereof. The apparatus may further include means for performing a passive scan of the search set of television white space channels to identify a television white space access point. For example, the means for performing the passive scan may include the passive scanning module 115 of FIGS. 1, 3, 5, and 8, one or more other devices configured to perform a passive scan of television white space channels, or any combination thereof.

Those of skill would further appreciate that the various illustrative logical blocks, configurations, modules, circuits, and algorithm steps described in connection with the embodiments disclosed herein may be implemented as electronic hardware, computer software, or combinations of both. Various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transitory storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal (e.g., a mobile phone or a PDA). In the alternative, the processor and the storage medium may reside as discrete components in a computing device or user terminal.

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments disclosed herein but is to be accorded the widest scope possible consistent with the principles and novel features as defined by the following claims.

What is claimed is:

1. A method comprising:
receiving, at a first electronic device, data associated with a location of the first electronic device, wherein the data is received from a second electronic device, wherein the first electronic device is located within a particular cell of a cellular network, and wherein the data includes a list of television white space access points within the particular cell;
determining, at the first electronic device, information based on the data;
filtering, at the first electronic device, an initial set of television white space channels based on the information to generate a search set of television white space channels; and
performing, at the first electronic device while the first electronic device is unenabled for communication via television white space channels, a passive scan of one or more television white space channels based on the search set to identify a television white space access point.

2. The method of claim 1, further comprising sending preliminary location information from the first electronic device to the second electronic device before receiving the data at the first electronic device.

3. The method of claim 2, wherein the list is based on the preliminary location information, wherein the second electronic device is a wireless access point, and wherein the data is received from the second electronic device via a non-television white space network while the first electronic device is unenabled for communication via television white space channels.

4. The method of claim 1, wherein the initial set of television white space channels comprises channels compliant with an International Institute of Electrical and Electronics Engineers (IEEE) 802.11af protocol, wherein the data is received via a beacon frame, and wherein the data is received from the second electronic device via a non-television white space network that includes a network compliant with an IEEE 802.11a protocol, an IEEE 802.11b protocol, an IEEE 802.11g protocol, an IEEE 802.11n protocol, an IEEE 802.11ac protocol, an IEEE 802.11ah protocol, or any combination thereof.

5. The method of claim 1, wherein the data further includes a country code, and wherein the method further comprises filtering the initial set of television white space channels based, at least in part, on the country code.

6. The method of claim 1, wherein the data identifies a regulatory domain, and wherein the method further comprises filtering the initial set of television white space channels based, at least in part, on the identified regulatory domain.

7. The method of claim 1, wherein the second electronic device is a base station of the cellular network, and wherein the data is received from the second electronic device via the cellular network.

8. The method of claim 7, wherein the list includes at least two television white space access points associated with the same television white space channel.

9. The method of claim 7, wherein the list includes at least one television white space access point associated with multiple television white space channels.

10. The method of claim 1, wherein the second electronic device includes a television white space database, and wherein the method further comprises sending a request for the data from the first electronic device to the television white space database.

11. The method of claim 10, wherein the request is transmitted via the Internet.

12. The method of claim 10, wherein the request includes preliminary location information that is received by the first electronic device from the cellular network.

13. The method of claim 10, wherein the request includes preliminary location information determined by a global positioning system (GPS) receiver of the first electronic device.

14. The method of claim 10, wherein the data received from the television white space database includes a list of permitted television white space channels.

15. The method of claim 1, further comprising:
maintaining a set of previously found television white space channels associated with previously visited locations, wherein the initial set of television white space channels includes the set of previously found television white space channels; and
filtering the initial set of television white space channels to remove previously found white space channels not associated with the location of the first electronic device.

16. The method of claim 15, wherein the initial set further includes television white space network identifiers associated with the previously found television white space channels, and further comprising:
maintaining a second set of previously found non-television white space network identifiers and associated locations;
detecting a particular non-television white space network identifier; and
determining the location of the first electronic device from the second set based on the particular non-television white space network identifier.

17. The method of claim 1, wherein the information is determined, the search set is generated, and the passive scan is performed responsive to a power up event at the first electronic device.

18. The method of claim 1, further comprising completing a television white space enablement process after identifying the television white space access point.

19. An apparatus comprising:
a processor; and
a memory storing instructions executable by the processor to:
receive, at a first electronic device via a cellular network while the first electronic device is located in a particular cell of the cellular network, data associated with a location of the first electronic device, wherein the data includes a list of television white space access points within the particular cell;
determine information associated with the location of the first electronic device based on the data;
filter an initial set of television white space channels based on the information to generate a search set of television white space channels; and
initiate, at a first electronic device while the first electronic device is unenabled for communication via television white space channels, performing a passive scan of one or more television white space channels based on the search set to identify a television white space access point.

20. The apparatus of claim 19, further comprising a global positioning system (GPS) receiver, the instructions executable by the processor to initiate sending of preliminary location information by the first electronic device before receiving the data at the first electronic device, wherein the preliminary location information is based on an output of the GPS receiver.

21. The apparatus of claim 19, wherein:
the memory further stores a set of previously found television white space channels associated with previously visited locations;
the initial set of television white space channels includes the set of previously found television white space channels; and
the instructions are further executable by the processor to filter the initial set of television white space channels to remove previously found white space channels not associated with the location of the first electronic device.

22. A non-transitory processor-readable medium comprising instructions that, when executed by a processor, cause the processor to:
receive, at an electronic device via a cellular network while the electronic device is located in a particular cell of the cellular network, data associated with a location of the electronic device, wherein the data includes a list of television white space access points within the particular cell;
determine, at the electronic device, information associated with the location of the electronic device based on the data;
filter an initial set of television white space channels based on the information to generate a search set of television white space channels; and
perform, at the electronic device while the electronic device is unenabled for communication via television white space channels, a passive scan of one or more television white space channels based on the search set to identify a television white space access point.

23. An apparatus comprising:
means for determining information associated with a location of an electronic device while the electronic device is located in a particular cell of a cellular network, wherein the information is determined based on data associated with the location of the electronic device, wherein the data is received at the electronic device via the cellular network, and wherein the data includes a list of television white space access points within the particular cell;
means for filtering an initial set of television white space channels based on the information to generate a search set of television white space channels; and
means for performing, at the electronic device while the electronic device is unenabled for communication via television white space channels, a passive scan of one or more television white space channels based on the search set to identify a television white space access point.

24. A method comprising:
determining, at an electronic device, information associated with a location of the electronic device;
sending a request from the electronic device to a television white space database, wherein the request includes the information;
receiving, at the electronic device, data associated with the location of the electronic device, wherein the electronic device is located within a particular cell of a cellular network, wherein the data lists a set of one or more television white space access points within the particular cell, wherein the data is received from the television white space database in response to the request, and wherein the set of one or more television white space access points is generated based on the information;
generating, at the electronic device while the electronic device is unenabled for communication via television white space channels, a search set of television white space channels by prioritizing television white space channels of the set of one or more television white space access points; and
performing a passive scan of one or more television white space channels of the search set of television white space channels to identify a television white space access point.

25. The method of claim 24, wherein the information is based on an output of a global positioning system (GPS) receiver of the electronic device.

26. The method of claim 1, wherein the first electronic device is a wireless mobile communication device.

27. The apparatus of claim 19, wherein the first electronic device is a wireless mobile communication device.

28. The non-transitory processor-readable medium of claim 22, wherein the electronic device is a wireless mobile communication device.

* * * * *